UNITED STATES PATENT OFFICE.

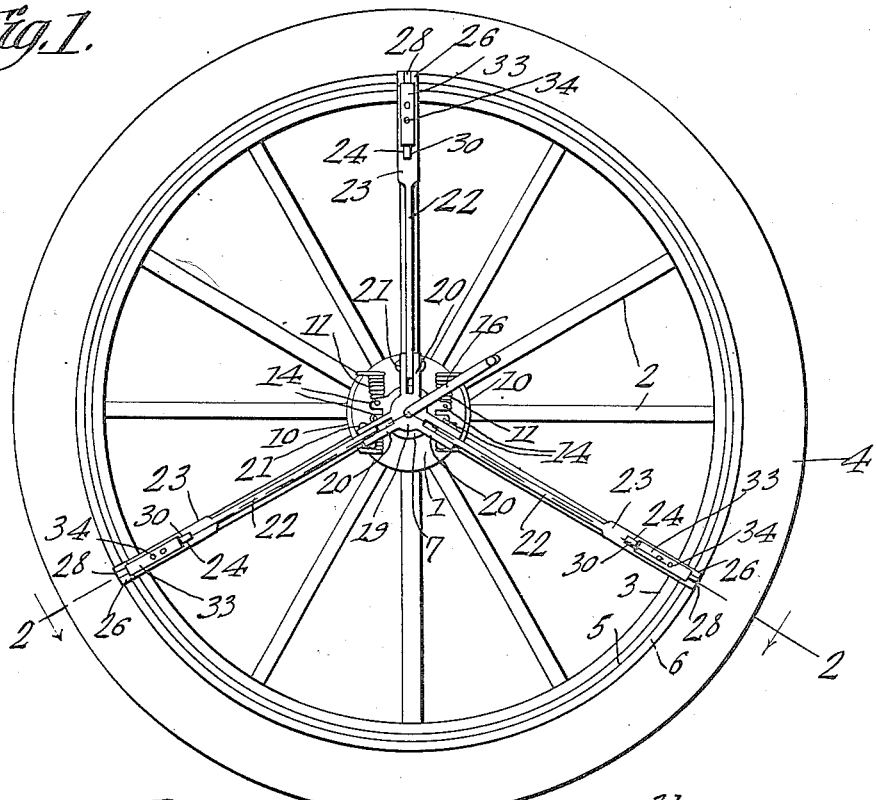

HARRY A. COVEY, OF AKRON, OHIO, ASSIGNOR OF ONE-HALF TO FRANK C. EBERLY, OF AKRON, OHIO.

TIRE REMOVER AND REPLACER.

1,170,612.      Specification of Letters Patent.      Patented Feb. 8, 1916.

Application filed December 3, 1914. Serial No. 875,313.

*To all whom it may concern:*

Be it known that I, HARRY A. COVEY, a citizen of the United States, residing at Akron, in the county of Summit and State of Ohio, have invented a new and useful Tire Remover and Replacer, of which the following is a specification.

The device forming the subject matter of this application is adapted to be employed for detaching a tire holding ring from a tire.

One object of the present invention is to provide novel means whereby the tire holding ring may be engaged at points which are spaced from each other circumferentially of the tire, means being provided whereby, from a single point of application, the pressure may be applied to the holding ring of the tire at circumferentially spaced points.

Another object of the invention is to improve the construction of the rim-engaging fulcrum member and to improve the construction of the compression member, novel means being provided for maintaining these elements in operative positions.

Another object of the invention is to improve the construction of the wheel-engaging thrust member and to provide novel means operatively connected with the thrust member, whereby a plurality of radiating levers may be actuated.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in plan; Fig. 2 shows the invention in section, parts being in elevation, the line 2—2 on Fig. 1 indicating the plane on which Fig. 2 is taken.

In the drawings the numeral 1 indicates the hub of a wheel from which radiate spokes 2 supporting a rim 3 carrying a tire 4. One side of the tire 4 is held in place by an inner ring 5 and a locking ring 6. The construction embodying the rings 5 and 6 may be of various forms and is common and well known in the art.

In carrying out the present invention there is provided a thrust member 7 provided with a flange 8 adapted to engage the hub 1, the flange 8 defining a compartment 9. Carried by the thrust member 7 are U-shaped resilient hub-engaging clips 10 which may be provided at their ends with approaching helical springs 11, the extremities 12 of which are connected with lugs 14 projecting from the thrust member 7. The flange 8 of the thrust member 7 is adapted to be pressed against the end of the hub 1 and the clips 10 coact with the hub to hold the thrust member in place thereon.

The actuating element is in the form of a screw 15 and is provided with a crank 16. The screw 15 is reduced to form a neck 17 journaled in the thrust member 7 and at the inner end of the neck 17 is formed a head 18 which, engaging the inner face of the thrust member 7, holds the screw 15 thereon rotatably, but against longitudinal displacement. It is in the compartment 9 that the head 18 is housed, as Fig. 2 will clearly show.

Threaded onto the screw 15 is a nut 19 in the form of a spider having radiating pairs of arms 20, the arms 20 of each pair being provided adjacent their outer ends with a pivot element 21 forming a support for a lever 22. There may be any number of these levers 22, three being shown in the present instance, the levers 22 radiating from a central point defined by the axis of rotation of the screw 15. Adjacent their outer ends, the levers 22 are enlarged to form heads 23 in which slots 24 are formed. Projections 25 which may be pins are mounted in the levers 22 and extend into or cross the slots 24. At their outer ends, the head portions 23 of the levers 22 are bifurcated to form fingers 26 supporting pivot elements 27 upon which are mounted to swing compression members 28 in the form of rods or bars, the extremities of the compression members 28 being concaved to form seats 29 adapted to engage the ring 5.

The invention includes a plurality of wheel-engaging fulcrum members 30, there being one fulcrum member 30 for each of the levers 22. The wheel-engaging members 30 are movable longitudinally in the slots 24 of the levers and may be held in adjusted positions by engaging the projections 25 of the levers between certain of the teeth 31 formed on the wheel-engaging members 30. At their extremities, the wheel-engaging members 30 are equipped with hooks 32 adapted to engage with the rim 3 as Fig. 2 most clearly discloses.

Mounted on the levers 22 adjacent their outer ends are springs 33, the same being held in place by securing elements 34. One end 35 of each spring 33 bears against the edge of the corresponding wheel-engaging fulcrum member 30 to hold the teeth 31 thereon engaging with the projection 25. The other end 36 of each spring 33 bears against the edge of the corresponding compression member 28 to maintain the same seated upon the ring 5. The ends 35 of the springs 33 coact with the wheel-engaging fulcrum members 30 to maintain the hooks 32 thereof engaged with the rim 3.

By a proper manipulation of the screw 15, the thrust member 7 will be pressed against the hub 1 and the nut 19 will be compelled to travel in the direction of the arrow A in Fig. 2. The wheel-engaging fulcrum members 30 will be drawn in the direction of the arrow B in Fig. 2, and, coacting with the rim 3 will form fulcrums upon which the levers 22 tilt, the outer ends of the levers 22 moving in the direction of the arrow C, and the compression members 28 being actuated accordingly, so as to move the ring 5 in the proper direction and permit a displacement of the tire 4 from the rim 3. Obviously, the structure may be employed for replacing a tire, as well as for removing one.

The wheel-engaging fulcrum members 30 may be moved longitudinally for adjustment and any of the teeth 31 therein may be engaged upon the projections 25 on the levers 22. After this adjustment has been effected, the teeth 31 will be held engaged with the projections 25 by the action of the ends 35 of the springs 33. As hereinbefore stated, the ends 36 of the springs 33 coact with the compression members 28 to hold the same in proper relation with respect to the rim 3.

Having thus described the invention, what is claimed is:—

1. In a device of the class described, a wheel-engaging thrust member; a screw journaled therein; a nut adapted to traverse the screw; a plurality of levers radiating from the nut and pivoted thereto at their inner ends; wheel-engaging fulcrums with which the levers are movably connected intermediate their ends; and compression members at the outer ends of the levers.

2. In a device of the class described, a wheel-engaging thrust member; resilient wheel-gripping means carried by the thrust member; a screw journaled in the thrust member; a nut adapted to traverse the screw; a plurality of levers radiating from the nut and pivoted thereto at their inner ends; wheel-engaging fulcrums with which the levers are movably connected intermediate their ends; and compression members at the outer ends of the levers.

3. In a device of the class described, a lever; a wheel-engaging fulcrum extended transversely of the lever; interengaging elements on the lever and the fulcrum; spring means coacting with the fulcrum to maintain said elements interengaged; a compression member at the outer end of the lever; and wheel-engaging means operatively connected with the inner end of the lever for tilting the lever.

4. In a device of the class described, a lever; a wheel-engaging fulcrum with which the lever is movably connected intermediate its ends; a compression member pivoted to the outer end of the lever; spring means on the lever and engaged with the compression member for holding the latter in adjusted positions; and wheel-engaging means operatively connected with the inner end of the lever for actuating the lever.

5. In a device of the class described, a lever; a wheel-engaging fulcrum disposed transversely of the lever; interengaging elements on the fulcrum and on the lever; a compression member pivoted to the outer end of the lever; and a spring secured intermediate its ends to the lever, one end of the spring bearing against the fulcrum to hold the said elements interengaged, and the other end of the spring bearing upon the compression member to hold the same in adjusted positions; and wheel-engaging means operatively connected with the inner end of the lever for actuating the lever.

6. In a device of the class described, a wheel-engaging thrust member; a screw journaled for rotation therein; a nut adapted to traverse the screw; a lever pivoted at its inner end to the nut and provided intermediate its ends with an opening, there being a projection on the lever and extended into the opening; a wheel-engaging fulcrum member extended transversely of the lever and adjustable in the opening, the fulcrum member having teeth adapted to engage the projection; a compression member pivoted to the outer end of the lever;

and spring means carried by the lever, the spring means engaging the fulcrum member and compression member upon opposite sides of the lever, thereby to swing the corresponding ends of the fulcrum member and the compression member toward each other.

In testimony that I claim the foregoing as my own, I have hereto affixed my signature in the presence of two witneses.

HARRY A. COVEY.

Witneses:
W. W. STEVENSON,
FRANK G. EBERLY.